United States Patent
Rosen

(10) Patent No.: US 12,257,944 B2
(45) Date of Patent: Mar. 25, 2025

(54) AIRCRAFT TRAILER

(71) Applicant: Air Vev Ltd, Pardes Hana (IL)

(72) Inventor: Chen Rosen, Mishmarot (IL)

(73) Assignee: Air Vev Ltd, Pardes Hana (IL)

( * ) Notice: Subject to any disclaimer, the term of this patent is extended or adjusted under 35 U.S.C. 154(b) by 0 days.

(21) Appl. No.: 18/699,895

(22) PCT Filed: Oct. 27, 2022

(86) PCT No.: PCT/IL2022/051141
§ 371 (c)(1),
(2) Date: Apr. 10, 2024

(87) PCT Pub. No.: WO2023/073710
PCT Pub. Date: May 4, 2023

(65) Prior Publication Data
US 2024/0326680 A1  Oct. 3, 2024

Related U.S. Application Data

(60) Provisional application No. 63/272,316, filed on Oct. 27, 2021.

(51) Int. Cl.
*B60P 3/11* (2006.01)
(52) U.S. Cl.
CPC .................................... *B60P 3/11* (2013.01)
(58) Field of Classification Search
CPC ........................................................ B60P 3/11
See application file for complete search history.

(56) References Cited

U.S. PATENT DOCUMENTS

| | | | |
|---|---|---|---|
| 2,820,642 A * | 1/1958 | Harper | B60P 3/11 104/126 |
| 3,353,862 A | 11/1967 | Tormolen | |
| 10,336,470 B2 * | 7/2019 | Fisher | B64F 1/02 |

(Continued)

FOREIGN PATENT DOCUMENTS

WO  WO 2023/073710  5/2023

OTHER PUBLICATIONS

International Preliminary Report on Patentability Dated May 10, 2024 From the International Bureau of WIPO Re. Application No. PCT/IL2022/051141 (6 Pages).

(Continued)

*Primary Examiner* — Jonathan Snelting

(57) ABSTRACT

Stowing systems and methods to disassemble, store, and/or protect an aircraft, and in particular a VTOL aircraft, for transportation along standard public roadways. A stowing system attaches to the aircraft in a flight-ready state, and guides, supports, and/or stabilizes sub-assemblies of the aircraft as they are removed and moved into their stowed positions in preparation for transportation. In some embodiments, the stowing system is implemented as a trailer. The trailer, in some embodiments, is towable by car, such that the aircraft can be carried on and transported with the car and trailer by road. In some embodiments, the stowing system defines landing platform for the aircraft. It may provide facilities to help direct the aircraft to a precise location allowing support elements of the stowing system to be moved to engage with sub-assemblies of the aircraft along predefined degrees of freedom.

20 Claims, 9 Drawing Sheets

(56) References Cited

U.S. PATENT DOCUMENTS

| | | | | |
|---|---|---|---|---|
| 11,148,805 | B2 * | 10/2021 | Cooper | B64U 70/97 |
| 11,511,886 | B1 * | 11/2022 | Tian | B64F 1/22 |
| 11,814,241 | B2 * | 11/2023 | Tian | B65D 90/14 |
| 2009/0309328 | A1 | 12/2009 | Gionta et al. | |
| 2010/0276897 | A1 | 11/2010 | Plummer | |
| 2018/0001812 | A1 | 1/2018 | Friemel et al. | |
| 2019/0322206 | A1 | 10/2019 | Lamy et al. | |

OTHER PUBLICATIONS

International Search Report and the Written Opinion Dated Jan. 19, 2023 From the International Searching Authority Re. Application No. PCT/IL2022/051141 (7 Pages).

* cited by examiner

AIRCRAFT TRAILER

RELATED APPLICATIONS

This application is a National Phase of PCT Patent Application No. PCT/IL2022/051141 having International filing date of Oct. 27, 2022, which claims the benefit of priority under 35 USC § 119 (e) of U.S. Provisional Patent Application No. 63/272,316 filed on Oct. 27, 2021. The contents of the above applications are all incorporated by reference as if fully set forth herein in their entirety.

FIELD AND BACKGROUND OF THE INVENTION

The present invention, in some embodiments thereof, relates to the field of aviation and more particularly, but not exclusively, to VTOL aviation.

Large human-carrying (e.g., human pilot carrying) aircraft may be disassembled for shipment along standard ground transportation routes including roads and/or rail, with individually shippable components including, for example, fuselage, wings, empennage, power plant, and landing gear.

SUMMARY OF THE INVENTION

According to an aspect of some embodiments of the present disclosure, there is provided an aircraft stowing system, including: a platform sized and shaped to receive the landing gear of an intact aircraft while supporting the aircraft's weight; and a plurality of support elements, moveable relative to the platform while also attached thereto, and moveable between at least: a first configuration, in which the support elements are approximated to respective sub-assemblies of the intact aircraft, and each positionable to support a portion of the weight of its respective sub-assembly upon detachment and/or loosening of the sub-assembly from the aircraft; a second configuration, in which the support elements with their respective supported sub-assemblies detached and/or loosened from the aircraft are moved into positions such that the aircraft is compacted in at least one dimension relative to the intact aircraft.

According to some embodiments of the present disclosure, each of the supported sub-assemblies is attached to its respective supporting support element.

According to some embodiments of the present disclosure, at least one of the support elements supports the entire weight of its respective supported sub-assembly.

According to some embodiments of the present disclosure, at least one of the supported sub-assemblies is detached from the aircraft.

According to some embodiments of the present disclosure, detachment removes mechanical support of the at least one supported sub-assembly by the frame of the aircraft while retaining a connection by cabling and/or wiring.

According to some embodiments of the present disclosure, the platform is a platform of a trailer, configured with wheels and towing hitch.

According to some embodiments of the present disclosure, the trailer including the aircraft, when the support elements with their respective supported sub-assemblies are in the second configuration, is 2.5 m wide or less.

According to some embodiments of the present disclosure, the transition between the first and second configurations includes, for each of a plurality of the support elements at least: a first motion that slides and/or rotates the support element at a location of attachment connecting it to a first portion of the platform; and
a second motion that moves the first portion of the platform together with the attached support element and relative to a second portion of the platform.

According to some embodiments of the present disclosure, the platform is foldable along one or more hinges, and the motion to transition between the first and second configurations includes folding the platform to bring the support elements and their respective supported sub-assemblies into new relative positions.

According to some embodiments of the present disclosure, folding the platform converts portions of the platform into walls on either side of a portion of the platform that remains as a floor.

According to some embodiments of the present disclosure, the floor supports a main fuselage of the aircraft, while the walls support at least some of the support elements and their respective supported sub-assemblies.

According to some embodiments of the present disclosure, at least one support element is configured to move along a track with its supported sub-assembly to transition between the first and second configurations.

According to some embodiments of the present disclosure, at least one support element is configured to rotate, along with its supported sub-assembly, around an axis substantially perpendicular to the platform at the support element's location of attachment thereto, to transition between the first and second configurations.

According to some embodiments of the present disclosure, at least one of the support elements attaches to a rotor assembly as its respective supported sub-assembly.

According to some embodiments of the present disclosure, the aircraft stowing system includes at least four support elements, each configured to attach to a respective rotor assembly.

According to some embodiments of the present disclosure, at least one of the support elements attaches to a wing as its respective supported sub-assembly.

According to some embodiments of the present disclosure, the aircraft stowing system includes at least two support elements, each configured to attach to a respective wing.

According to some embodiments of the present disclosure, the aircraft stowing system includes an electrical charger, configured to provide electrical power to batteries of the aircraft while the aircraft is located on the platform.

According to some embodiments of the present disclosure, the aircraft stowing system includes a ramp.

According to some embodiments of the present disclosure, the aircraft stowing system includes a winch.

According to some embodiments of the present disclosure, the aircraft stowing system includes an aircraft position sensor, and configured to communicate the sensed position to the aircraft while the aircraft is positioned on the platform, to guide the aircraft into a parked position.

According to some embodiments of the present disclosure, the platform folds to a width sized to fit within an opening of a cargo container door.

According to some embodiments of the present disclosure, the width is less than about 2.34 m.

According to some embodiments of the present disclosure, the platform folds to a height sized to fit within an opening of a garage door.

According to some embodiments of the present disclosure, the height is less than about 2.44 m.

According to an aspect of some embodiments of the present disclosure, there is provided a method of stowing an aircraft, including: positioning an aircraft on a platform including a plurality of support elements attached to the platform; attaching the support elements to respective sub-assemblies of the aircraft while the support elements remain attached to the platform; and moving the support elements to new positions compacting the aircraft and the platform in at least one dimension while remaining attached to both the platform and their respective sub-assemblies.

According to some embodiments of the present disclosure, the positioning includes landing the aircraft on the platform from the air.

According to some embodiments of the present disclosure, the landing includes homing the aircraft on to the platform using a signal provided by the platform.

According to some embodiments of the present disclosure, the positioning includes automatically taxiing the aircraft on the platform, according to a sensed position of the aircraft along the platform.

According to some embodiments of the present disclosure, the moving includes folding the platform.

According to some embodiments of the present disclosure, folding moves portions of the platform to form surfaces at least partially enclosing the aircraft and the sub-assemblies.

According to some embodiments of the present disclosure, the method includes detaching the respective sub-assemblies from a main fuselage of the aircraft.

According to some embodiments of the present disclosure, the moving includes moving at least one of the support elements to a new location of attachment with the platform while remaining attached to the platform.

According to some embodiments of the present disclosure, the moving includes rotating at least one of the support elements around a location of attachment with the platform while remaining attached to the platform.

According to some embodiments of the present disclosure, the platform is part of a trailer, and including towing the trailer while the support elements with their respective attached sub-assemblies are in the new positions.

According to some embodiments of the present disclosure, the method includes loading the platform onto a trailer while the support elements with their respective attached sub-assemblies are in the new positions.

According to some embodiments of the present disclosure, the method includes towing the trailer with the loaded platform.

According to an aspect of some embodiments of the present disclosure, there is provided a method of using an aircraft-carrying trailer, the method including: unfolding walls of the aircraft trailer away from a floor of the trailer; landing an aircraft on the floor of the trailer; and folding the walls up again, with at least a fuselage of the aircraft secured upon the floor of the trailer.

According to an aspect of some embodiments of the present disclosure, there is provided an aircraft-carrying trailer configured to unfold, receive an aircraft, and fold again, when used according to the method described above.

According to an aspect of some embodiments of the present disclosure, there is provided a method of using an aircraft-carrying trailer, the method including: landing an aircraft on the trailer, with landing gear of the aircraft contacting the trailer at a first position on a floor of the trailer; taxiing the aircraft to move the landing gear along the floor to a predetermined parking position on the floor of the trailer; and securing the aircraft to the trailer, the securing including moving arms and levers of the trailer to engage portions of the aircraft.

According to an aspect of some embodiments of the present disclosure, there is provided an aircraft-carrying trailer having a floor defining a predetermined parking position of an aircraft, and configured to receive and secure the aircraft, when used according to the method described above, According to an aspect of some embodiments of the present disclosure, there is provided a method of stowing an aircraft, the method including: securing the aircraft to an aircraft trailer through a plurality of attachment points provided on the aircraft trailer; and reconfiguring the aircraft trailer to move the attachment points relative to each other; wherein the reconfiguring moves components of the aircraft to their stowed positions on the aircraft trailer.

According to an aspect of some embodiments of the present disclosure, there is provided an aircraft-carrying trailer, having attachment points with reconfigurable relative positions, and configured to stow components of an aircraft when used according to the method described above.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system" (e.g., a method may be implemented using "computer circuitry"). Furthermore, some embodiments of the present disclosure may take the form of a computer program product embodied in one or more computer readable medium(s) having computer readable program code embodied thereon. Implementation of the method and/or system of some embodiments of the present disclosure can involve performing and/or completing selected tasks manually, automatically, or a combination thereof. Moreover, according to actual instrumentation and equipment of some embodiments of the method and/or system of the present disclosure, several selected tasks could be implemented by hardware, by software or by firmware and/or by a combination thereof, e.g., using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computer using any suitable operating system. In some embodiments of the present disclosure, one or more tasks performed in method and/or by system are performed by a data processor (also referred to herein as a "digital processor", in reference to data processors which operate using groups of digital bits), such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well. Any of these implementations are referred to herein more generally as instances of computer circuitry.

Any combination of one or more computer readable medium(s) may be utilized for some embodiments of the present disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium may also contain or store information for use by such a program, for example, data structured in the way it is recorded by the computer readable storage medium so that a computer program can access it as, for example, one or more tables, lists, arrays, data trees, and/or another data structure. Herein a computer readable storage medium which records data in a form retrievable as groups of digital bits is also referred to as a digital memory. It should be understood that a computer readable storage medium, in some embodiments, is optionally also used as a computer writable storage medium, in the case of a computer readable storage medium which is not read-only in nature, and/or in a read-only state.

Herein, a data processor is said to be "configured" to perform data processing actions insofar as it is coupled to a computer readable medium to receive instructions and/or data therefrom, process them, and/or store processing results in the same or another computer readable medium. The processing performed (optionally on the data) is specified by the instructions, with the effect that the processor operates according to the instructions. The act of processing may be referred to additionally or alternatively by one or more other terms; for example: comparing, estimating, determining, calculating, identifying, associating, storing, analyzing, selecting, and/or transforming. For example, in some embodiments, a digital processor receives instructions and data from a digital memory, processes the data according to the instructions, and/or stores processing results in the digital memory. In some embodiments, "providing" processing results comprises one or more of transmitting, storing and/or presenting processing results. Presenting optionally comprises showing on a display, indicating by sound, printing on a printout, or otherwise giving results in a form accessible to human sensory capabilities.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present disclosure may be described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such inspecting objects, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the present disclosure are herein described, by way of example only, with reference to the accompanying drawings. With specific reference now to the drawings in detail, it is stressed that the particulars shown are by way of example, and for purposes of illustrative discussion of embodiments of the present disclosure. In this regard, the description taken with the drawings makes apparent to those skilled in the art how embodiments of the present disclosure may be practiced.

In the drawings.

DESCRIPTION OF SPECIFIC EMBODIMENTS OF THE INVENTION

Figure 1A:
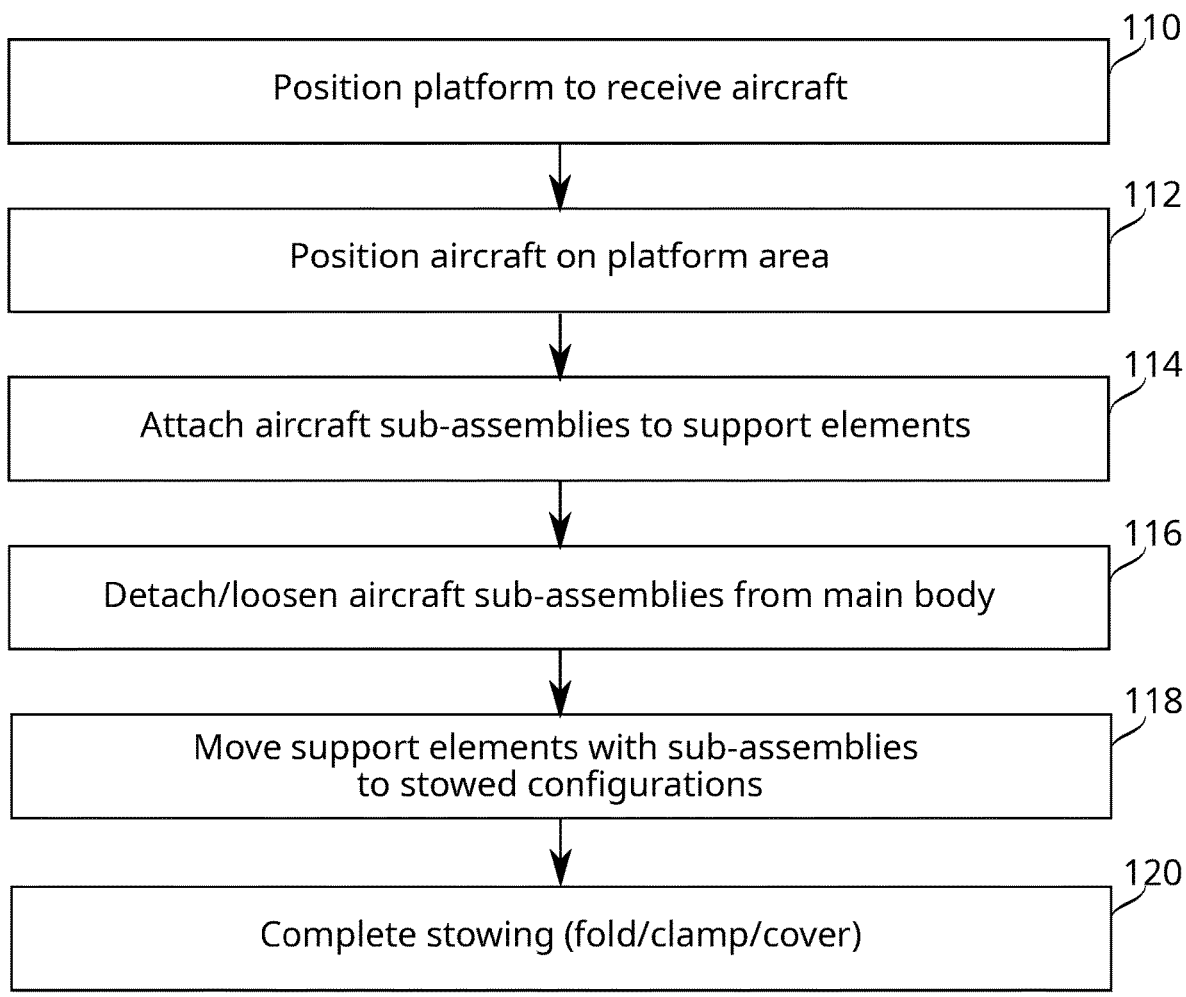
FIG. 1A schematically illustrates a method of stowing (packing) an aircraft for transportation, according to some embodiments of the present disclosure.

The present invention, in some embodiments thereof, relates to the field of aviation and more particularly, but not exclusively, to VTOL aviation.

Overview

An aspect of some embodiments of the present disclosure relates to the stowing of an aircraft for transportation along standard public roadways. In some embodiments, the stowing is assisted by a stowing system which attaches to the aircraft to guide, support, and/or stabilize sub-assemblies of the aircraft as they are removed or folded, and/or as and/or after they are moved into their stowed positions in preparation for transportation. In some embodiments, the stowing system is moreover implemented as a trailer. The trailer, in some embodiments, is towable by car, such that the aircraft can be carried on and transported with the car and trailer by road.

Some uses of embodiments of the present disclosure, more particularly, are suitable to be performed in conjunction with aircraft which are vertical takeoff and landing (VTOL) capable; that is, capable of contacting the ground from flight and/or leaving it for flight with a horizontal velocity of zero or near zero, and at any rate a horizontal velocity far too low to provide meaningful vertical lift to the aircraft. These uses include, in particular, uses wherein the aircraft lands on a platform provided by the stowing system, and/or takes off directly from that platform. In some embodiments, landing is immediately nearby the platform, e.g., within the length of a pull-cable which can be used to draw the aircraft onto the platform.

In some embodiments, the aircraft reversibly transitions between a stowed configuration and a ready-for-flight configuration. The transition optionally is performed in place at an airfield landing site, by an individual person (e.g., the pilot), and/or without the use of additional special tools. Optionally, the transition is guided and supported by support elements of the trailer which also transports the aircraft. In some embodiments, the aircraft is brought onto or adjacent to the trailer, e.g., next to the trailer or landed directly on the trailer. A mechanism on the trailer folds/disassembles or assists in the folding/disassembling of parts that need to be folded/disassembled for transportation.

In some embodiments, the support elements are brought to approach various respective sub-assemblies of the aircraft (approximated to them), and then attached thereto, while the aircraft is in a ready-for-flight configuration (optionally and preferably while also being and/or remaining attached to the trailer). Optionally, support elements provide weight support without attachment as such (e.g., a sub-assembly's weight rests on the support element without the support element being otherwise secured to sub-assembly). Weight support assists, for example, in one-person stowing of sub-assemblies which are too heavy and/or unwieldy for a single person to handle comfortably. In some embodiments, sub-assemblies of the aircraft are detached from the main fuselage of the aircraft. The support elements at least partially support the detached sub-assemblies, optionally including support and/or stabilization pre-detachment and/or during detachment. The support elements are then operated to guide the detached sub-assemblies to new relative positions (while continuing to provide sub-assembly support). This may comprise, e.g., sliding, rotating, folding, and/or bending of the support elements; e.g., sliding and/or rotating relative to a location of attachment of a support element to the trailer. Preferably, the new relative positions are arranged to directly or eventually (i.e., after the movement of structural elements of the trailer as next described) compact the aircraft, i.e., reduce one or more dimensions of a three dimensional minimal bounding box. In particular, a width of the aircraft is reduced in a direction which corresponds to the orientation of the width of a road down which the trailer is to be transported. These motions generally comprise at least movement of the support elements relative to the platform by motion at a location of attachment connecting the support element to the platform.

Concurrently and/or subsequently, structural elements of the trailer may also change their configuration, e.g., a flat working area may be folded up along one or more hinges to form walls and floor of a partially or fully enclosed trailer bed. Contributing to the compaction of the aircraft, these structural element rearrangements may move the support elements to new relative positions (along with the aircraft sub-assemblies the support elements are attached to). These motions are characterized, in some embodiments, by movements of portions of the platform relative to each other, which also carry with them their respective attached support elements.

For example, a structural element which folds through a right angle to form a wall of the trailer bed may, in folding, also rotate a support element attached to it, along with an aircraft sub-assembly attached to the support element, such as a wing section. The folding may be performed with the use of assistive actuation by a motor, an electrically and/or manually operated winch system, and/or by directly by manipulating (lifting) the structural element (e.g., a panel or frame). The structural elements may also directly act as support elements. Final arrangements to secure the structural elements, the support elements, and/or the various detached aircraft sub-assemblies may include the use of straps, clamps, buckles, bolts, and/or other hardware to support and/or stabilize the trailer-aircraft in its stowed configuration. The main fuselage or other largest remaining sub-assembly of the aircraft may be secured in place, or may be moved (e.g., rolled) to a final position to be secured for transport.

After transportation and prior to flight, the mechanism on the trailer unfolds/assembles or assists in the unfolding/assembling of sub-assemblies that need to be unfolded/assembled for flight.

The stowed configuration (including trailer), in some embodiments, is sized and shaped to be transported along public roadway, preferably without exceeding the space requirements for a single standard lane of traffic. In some embodiments, the stowed configuration is least within the limits of a wide-load permit.

The ready-for flight configuration, in some embodiments, significantly exceeds these space requirements; e.g., the aircraft possesses one or both of a wing span and nose-to-tail length which are larger than can be transported at all on a roadworthy/road-approved trailer (e.g., because of extending into lanes of oncoming traffic), or larger than can be transported without special arrangements (e.g., an oversize load permit). For example, long (e.g., 2.5 m or longer) loads which are also wider than about 2.5 m may exceed the limits of standard land shipping options. In effect, the aircraft size does not allow road transportation, so that it needs to be folded or otherwise compacted for such transportation. Folding or otherwise compacting the aircraft involves moving or removing large or heavy components such as wings and motors and motor arms and propellers, which can be difficult physically, and potentially unmanageable for a single person.

In some embodiments, the stowed configuration differs from the ready-for-flight configuration at least by detaching of a wing element (e.g., the aircraft's transversely longest lifting element) from a main fuselage. Additionally or alternatively, in some embodiments, the stowed configuration differs from the ready-for-flight configuration by the dismounting from the main fuselage of a plurality of rotors, e.g., rotors oriented to provide vertical lift, and optionally attached to the main fuselage via one or more mounting arms. The mounting arms may themselves be fully and/or partially detached as parts of sub-assemblies including the rotors. Alternatively, one or more of the mounting arms is also disassembled from its respective rotor(s).

In certain scenarios, it is a potential advantage for an aircraft to be designed with the provision of a "normal" (i.e., not merely for maintenance) and well-defined method of two-way interconversion between collapsed and flight-ready states. Some such scenarios involve situations where an aircraft is moved between locations along the ground using standard public roadways. Examples of reasons for such transportation include:

A short-range aircraft is operated over a plurality of short hop routes which are mutually out of range.

An aircraft has landed (accidentally or on purpose) out of range of suitable refueling/recharging facilities, and/or other required maintenance facilities.

A (terrestrial) driver and towing vehicle or (water-borne) crew and craft but not an (aerial) pilot is available to transfer the aircraft to its next destination.

An aircraft prepared/maintained in one area is to be flown from another region (e.g., for the convenience of passenger and/or pilot, and/or for the sake of conserving flight range).

An aircraft is used for locale-specific purposes (e.g., aerial monitoring/inspection, recreation), so that it is preferable to save flight costs and/or conserve aircraft range in bringing the aircraft to the locale.

There are potential advantages in simplifying transition operations in various aspects, e.g., to reduce added effort, time and/or opportunity for error. For example, the transitions may be simplified to the extent that they can be integrated into routine pre- and/or post-flight operations. Even when the transitions are performed more rarely, there are potential advantages simply in making sure that all components are dependably secured for transportation, e.g., in an approved fashion. Aspects of simplification of collapsed/flight-ready transition include reduction, for example, of one or more of the following:

Time needed to perform the transitions. For example, in some embodiments, the transition is performed by a single operator in less than 10 minutes, or less than 5 minutes.

Number of transition steps needing to be manually performed.

Number of persons needed to execute transitions. For example, in some embodiments, a single operator can perform all transition operations alone, even operations that involve the movement of awkwardly large sub-assemblies (e.g., 2 meters or more in length), and/or heavy sub-assemblies (e.g., 50 kg, 75 kg, or 100 kg or more).

Need for lifting by individuals of heavy and/or bulky components, for example, sub-assemblies as just described.

Need for carrying by individuals of heavy and/or bulky components, for example, sub-assemblies as just described.

Potential for errors in disassembly/reassembly. For example, in some embodiments, degrees of freedom defined by support elements constrain attached and/or supported sub-assemblies to move along pre-defined paths.

Potential for errors in securing parts. For example, in some

Potential for component damage as a result of transitions and/or transportation.

In some embodiments, transition simplification in one or more of the above aspects is provided through a stowing system which attaches to the aircraft in its assembled or nearly assembled state (e.g., flight-ready state). In some embodiments, but not necessarily, this stowing system is also itself a trailer (e.g., a trailer comprising components as set forth hereinbelow). Detachable aircraft sub-assemblies are released from their normal connections to the aircraft itself, but the stowing system retains its connections to those sub-assemblies individually. For example, wings and/or struts are removed, and/or motors are removed from their mountings. Detachment comprises mechanical detachment of affixing/securing hardware. Optionally, some partial attachment (e.g., of wires and/or flexible mounting points) between sub-assembly and the main aircraft is retained during stowage.

Then, in some embodiments, by motions through degrees of freedom the stowing system at least partially (and optionally fully) defines, the sub-assemblies are rearranged into a new geometrical configuration suitable for over-road transportation. The stowing system provides pre-defined attachments for the aircraft sub-assemblies. This provides the potential advantage of helping to ensure that the sub-assemblies are stabilized during detachment. Insofar as the stowing system defines what movements are possible by its degrees of freedom, it potentially helps avoid events such as heavy components striking the ground and/or each other. Insofar as the stowing system defines collapsed arrangements of aircraft components by its degrees of freedom, their ranges of motion, and/or their designated final positions, it potentially helps avoid errors in stowage of the aircraft sub-assemblies which could lead to their damage during transportation.

Upon reaching a destination, and/or after a period of storage, reversing these motions places the sub-assemblies back in position to be reassembled (although strict reversal of the original motions is not necessarily required; e.g., a partial rotation may be completed rather than reversed to bring a sub-assembly back to its re-attachable position, and/or some motions may be performed in a different order than strict reversal). During and/or after reassembly, the stowing system is operated to release the aircraft sub-assemblies, with the aircraft finally being restored to its assembled or nearly-assembled state, e.g., its flight-ready configuration.

The motions performed to move aircraft sub-assemblies around while attached to the stowing system may be motorized and/or human-powered. In some embodiments, the stowing system also provides assistance in detaching/re-attaching sub-assemblies, e.g., it may include tools for operating connectors and/or storage for connectors. In some embodiments, interlocks are provided which help to ensure that sub-assemblies are moved, disconnected and/or connected in an orderly fashion, e.g., to avoid their mutual interference, and/or to help ensure that sub-assemblies are not left in a partially re-attached state by accident.

In some embodiments, the stowing system furthermore comprises a trailer—i.e., the stowing system comprises components such as wheels, tires, axle(s), bed, suspension, and/or towing hitch. Optionally, the trailer also comprises containing walls which protect the aircraft on two or more sides, e.g., to help ensure that it does not receive damage during road transportation. The containing walls may themselves comprise moveable structural elements as described hereinabove, e.g., structural elements which interconvert between bed and wall, depending on configuration. A wall and/or roof not itself bearing moveable structural elements may be foldable into place, fixed, reversibly detachable, or otherwise provided. A wall and/or roof element may serve one or more secondary functions (e.g., as a ramp).

In some embodiments, the stowing system, while engaged with the collapsed aircraft, assumes an overall geometry which is compatible with loading onto a trailer which is configured for towing along standard roadways. For example, the stowing system may have skids or small wheels which allow it to be winched up onto a trailer bed for transport. Optionally, the stowing system itself provides protective walls (e.g., for use with an open-bed trailer), and/or the trailer may be relied on to provide such protection. In some embodiments, the stowing system stows and separates sub-assemblies from the main fuselage, which is optionally stored and/or transported on the same trailer. In some embodiments, the main fuselage is transported "surrounded" by its detached sub-assemblies (i.e., with components on two or more sides of it). In some embodiments, the detached sub-assemblies are compacted without leaving space for the fuselage to be transported in amongst them. The fuselage is then transported, e.g., above, below, beside, ahead of, or behind its detached sub-assemblies, preferably on the same trailer, or (optionally) by a second trailer or other transportation device. To the extent that the stowing system attached to aircraft sub-assemblies and/or main fuselage is normally or specially separable from components providing its trailer functionality, the stowed aircraft and attached stowing system may be transported by means other than road towing, e.g., transport may be via container shipping or rail car/flatbed. For example, the stowing system together with aircraft in collapsed state may fit through a container door opening less than about 2.34 m wide and about 2.26 m tall or about 2.58 m tall. The stowing system together with aircraft in a collapsed state may fit within a 10 foot container, a 20 foot container, and/or a 40 foot container. In some embodiments, the stowing system together with aircraft fits through a garage door opening—for example, an opening less than about 2.13 m tall, or less than about 2.44 m tall.

Use of an aircraft-attachable stowing system has potential advantages over designing an aircraft to be fully "self-transitioning" (folding), by transferring weight and/or complexity to a sub-system which does not itself need to fly or be flight worthy. Components such as side-walls which have no use in flight can be provided without incurring range costs. There may also be a potential for a more efficient use of space since components can be entirely detached from the aircraft and moved, rather than be constrained by the need to retain attachment while folding.

In some embodiments, a plurality of stowing systems may be used to maintain a rooftop or otherwise space-constrained landing area (e.g., an urban parking lot or other storage facility) useful for a plurality of aircraft, collapsing aircraft as they arrive and parking them in the collapsed configuration away from the landing pad. This may be particularly suitable for non-trailer embodiments of the present disclosure, where the usual distance to travel is small, and space is at a premium.

Before explaining at least one embodiment of the present disclosure in detail, it is to be understood that the present disclosure is not necessarily limited in its application to the details of construction and the arrangement of the components and/or methods set forth in the following description and/or illustrated in the drawings. Features described in the current disclosure, including features of the invention, are capable of other embodiments or of being practiced or carried out in various ways.

Method of Stowing, and Examples of Stowing Systems

Reference is now made to FIG. 1A, which schematically illustrates a method of stowing (packing) an aircraft for transportation, according to some embodiments of the present disclosure.

At block 110, in some embodiments, a platform area of a stowing system is prepared to receive an aircraft. For example: in some embodiments, a trailer is parked on a flat surface and its walls are opened so that they are parallel and in the same plane as the trailer floor and together create a flat large plane suitable for vertical landing. In some embodiments, the trailer is operable on slight inclines. The incline may be leveled out, in some embodiments, by tilting the platform area relative to the base it is mounted on, e.g., relative to the wheels of the trailer, using automatically and/or manually adjustable suspension elements.

Figure 2A:
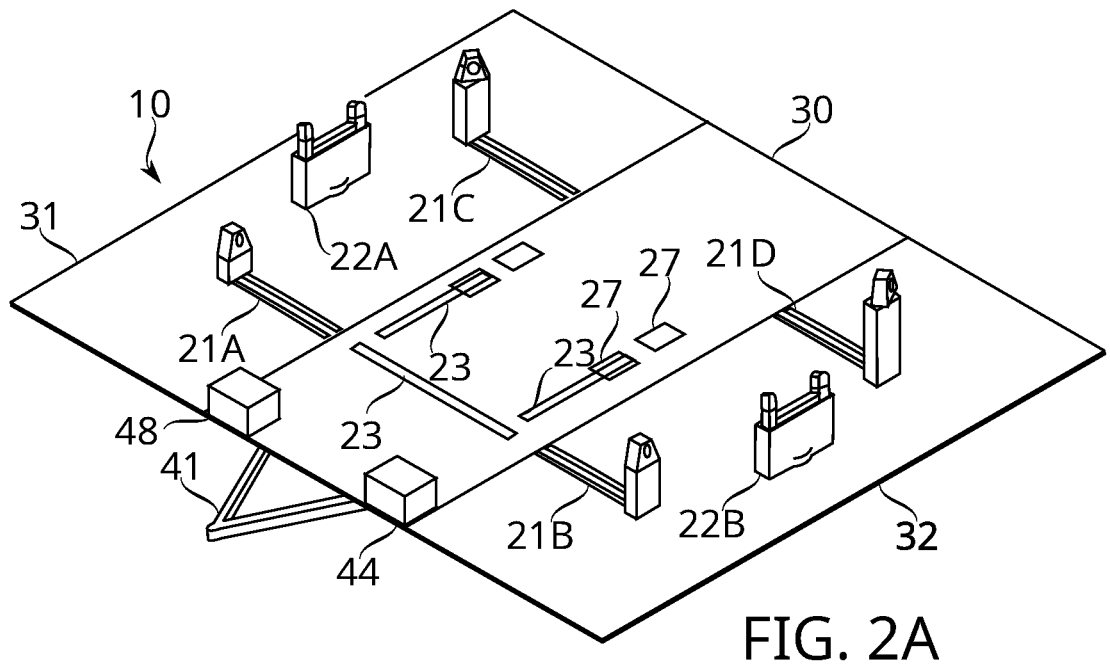
FIG. 2A shows the receiving configuration of a trailer stowing system, according to some embodiments of the present disclosure.

Brief reference is made to FIG. 2A, which shows the receiving configuration of a trailer stowing system 10, according to some embodiments of the present disclosure. In the example shown, the platform comprises panels 30, 31, and 32. In some embodiments, the three panels are laid out parallel to each other; optionally also level and/or abutting. Panel 30 thus provides a main area of the platform on which an aircraft may be supported; optionally panels 31 and 32 are also part of the platform.

Figure 7:
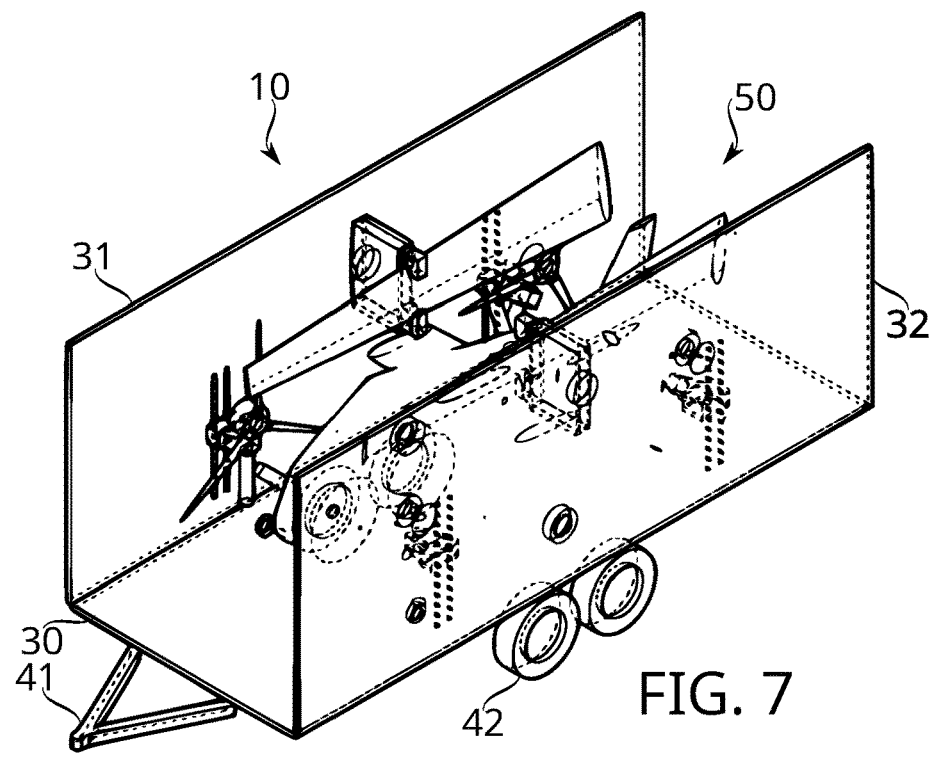
FIG. 7 shows a folded-wall form of the embodiment illustrated in FIGS. 3A and 6A, according to some embodiments of the present disclosure.

In the stowed configuration, panels 31 and 32 are also walls of the trailer stowing system 10, e.g., as described in relation to FIG. 7. Support elements provided for the guidance, support, and/or stabilization of aircraft sub-assemblies include: rotor assembly supports 21A, 21B, 21C, and 21D; and wing support 22A and 22B. Optionally, trailer hitch 41 is provided, as well as wheels 42 (not seen in FIG. 2A, but described, for example, in relation to FIG. 7).

In some embodiments, stowing systems operate with electrically powered aircraft. Optionally, a built-in charger station 44 is provided. This can receive energy from the towing vehicle, and/or comprises batteries so that it itself serves as an energy reserve. Batteries of charger station 44 may also provide power for automatic operations of the stowing system, such as the movements of element supports. For the sake of simplicity of illustration, charger station 44 is not shown in other figures, but it should be understood, optionally, to be present in any of the embodiments described herein.

In some embodiments, stowing systems include sensing elements, for example, cameras, position encoders, knock sensors, vibration sensors, force sensors, environmental sensors (e.g., temperature and/or humidity), or another type of sensor. These are not separately shown, however, it may be understood that such sensors can be placed in/with any of the support elements, panels, rails, wheels, suspension or other elements of stowing system 10, or any other stowing system described herein. Controller interface 48 optionally connects to any of these sensors by wired and/or wireless communication. Controller interface 48 optionally is provided together with other hardware (e.g., processor and memory) and/or software which provides access to sensed data. For example, sensed data may be broadcast wirelessly to a communications network that allows the data to be remotely stored and/or accessed. Additionally or alternatively, sensed data may be accessed directly from the stowing system by wired or wireless connection. In some embodiments, controller system 48 is used for the actuation of any automatically operating elements of the stowing system 10, for example, electrical motors which operate to actuate support elements. For the sake of simplicity of illustration, controller interface 48 is not shown in other figures, but it should be understood, optionally, to be present in any of the embodiments described herein. More particularly, it may be provided in support of any sensing and/or actuation capability described in conjunction with any of the embodiments described herein.

The example of FIG. 2A illustrates a stowing system comprising four support elements for rotor assemblies, and two for wings. More generally, support elements for any number of such sub-assemblies may be provided, including support elements for a portion of such sub-assemblies, where present. Other example of sub-assemblies that may be supported include empennage, other types of power plants besides rotor assemblies (e.g., engines which may be externally mounted, e.g., in cowlings) landing gear, and the fuselage itself (for example, if the landing gear is collapsed/detached/loosened in whole or in part, the fuselage may be provided with a replacement support element. Any of these or other sub-assemblies is optionally itself composed of a plurality of sub-assemblies; for example a fuselage may be disassembled into a plurality of sections, one or more of which is provided with its own respective support element.

Figure 9:
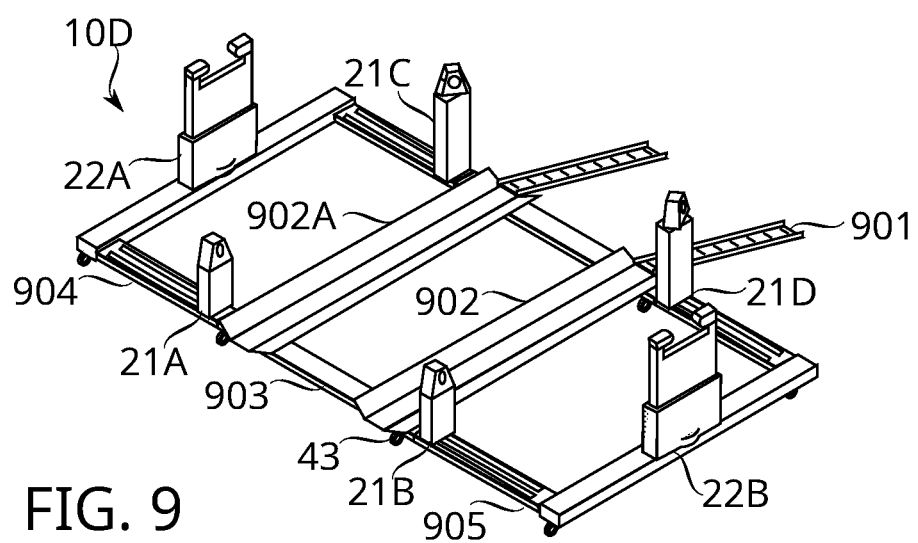
FIG. 9 shows the receiving configuration of a stowing system, according to some embodiments of the present disclosure.

Brief reference is also made to FIG. 9, which shows the receiving configuration of a stowing system 10D, according to some embodiments of the present disclosure. Stowing system 10D is not itself configured to be operated standalone as a trailer, but optionally is used together with a trailer, which may be specially fitted to stowing system 10D, or general purpose (e.g., a trailer carrying a cargo container into which stowing system 10D may be fitted.

In place of a flat surface, rails 902 are provided as a platform. The rails 902 are supported by cross-girders 903, and sized and spaced to accommodate the landing gear of an aircraft. Optionally, ramps 901 are provided to assist positioning of the aircraft on rails 902 from an off-platform starting position. In some embodiments, rails 902 are provided with oversized, outward leaning guide-walls 902A. These walls may assist in positioning/guiding the aircraft if it is being landed directly onto the rails 902. Frames 904, 905 support the support elements 21A-21D and 22A-22B. Frames 904, 905, in some embodiments, can be folded up similarly to panels 31, 32. Any or all of frames 903, 904, 905 may be open, defining one or more frame apertures by the gap(s) formed between its various supports. Optionally, these gaps are filled so as to form walls.

Returning to FIG. 1A: at block 112, in some embodiments, the aircraft is positioned on the platform defined by the stowing system 10, 10D, or another embodiment of stowing system.

In some embodiments, the aircraft lands on the trailer (that is, on the platform area) as part of its positioning. For non-trailer stowing systems, the aircraft may similarly land on the platform area directly. In some embodiments, landing is assisted by markings and/or beacons which guide the aircraft to the platform area. For example, the aircraft may include a guidance system which uses a pattern of optical marks on the platform area to guide itself into position. Additionally or alternatively, the stowing system may provide an active or passive beacon—e.g., a light beacon that simply shines up at an angle appropriate for the aircraft to glide in along to a landing, or a light (e.g., laser) beacon which is guided in communication with the aircraft to point at the aircraft signal it. In some embodiments, the stowing system optically detects the aircraft, and signals its estimated relative position to assist the aircraft's on board systems in landing. In some embodiments, the stowing system conveys to the aircraft signals that include information about the local ground environment, e.g., momentary wind speed, gusting conditions, and the like. This can assist the aircraft's on board navigation in determining how, when, and/or whether to approach the platform area and land. The stowing system optionally comprises one or more sensors to help determine ground environment conditions; for example, an anemometer.

In some embodiments (e.g., in case wind is erratic), the aircraft optionally lands away the platform area, and is then conveyed to the platform area; e.g., by a short taxi and/or operation of a winch.

Embodiments defining a relatively smooth platform surface (e.g., the embodiment of FIG. 2A) provide a potential advantage for landing directly on the platform, insofar as this provides tolerance to permit errors in landing (e.g., errors of 10, 20 or more centimeters), particularly errors in the left-to-right direction. Embodiments defining a platform comprising rails rather than a continuous surface (e.g., stowing system 10D of FIG. 9) are optionally provided with guide walls on the rails which help to ensure that the aircraft properly seats into position upon landing.

Positioning forward and backward may be adjusted by rolling the aircraft. In some embodiments, after landing, the aircraft will automatically taxi on the trailer (or other stowing system embodiment) to its parking point. The taxiing distance moves the aircraft over a distance of, for example, up to 1 m to a parking position on the trailer that will allow the trailer mechanisms (e.g., support elements 21A-21D, 22A-22B) to grip aircraft parts for disassembly. In some embodiments, the aircraft automatically taxis onto the platform area, e.g., via ramp. Optionally, taxiing is fully or partially under manual control.

Guidance for this automatic taxiing is achieved, in some embodiments, using one or more optical and/or electronic markers 23 positioned on the stowing system 10, detected by a suitable detection camera or sensor on the aircraft. Additionally or alternatively, the marker is on the aircraft and the sensor on the trailer. In some embodiments, a computer controls electric wheels 54 (FIG. 3A) of the aircraft to taxi it to the parking position. If the sensor or guidance computer is located in the trailer, it transmits the guidance data or control aircraft taxi wirelessly. A potential advantage of landing directly on the platform is to avoid the need to ascend a ramp, which may allow the reduction of control and/or power requirements on the taxiing system. Manual control is optionally performed by modification of the operation of this system (e.g., speeding, slowing, and/or calibrating its operation). Manual control is optionally performed by overriding this system. Optionally, manual control is the primary method of positioning the aircraft. Once positioned, the aircraft is considered parked in its parking position. At least along the forward/reverse axis the parking is preferably precise, e.g., to within 1-2 cm, as this is the axis which, in some embodiments, provides the least freedom of adjustment of the support elements to bring them up to their respective aircraft sub-assemblies. In some embodiments, this requirement is reduced by providing the support elements with additional degrees of freedom of movement to assist attachment. However, it is a potential advantage to use precise aircraft positioning instead. This reduces complexity requirements imposed the stowing system, while making use of an aircraft taxiing system which may anyway be needed for longer distance taxiing and position control.

In some embodiments, other elements are provided to help secure an aircraft in position. For example, actuatable aviation chocks 27 (shown in FIGS. 2A and 3A, an optionally provided with any of the embodiments described herein) may raise to help center an aircraft 50 in the parked position, and/or hold it in position once parked.

Figure 3A:
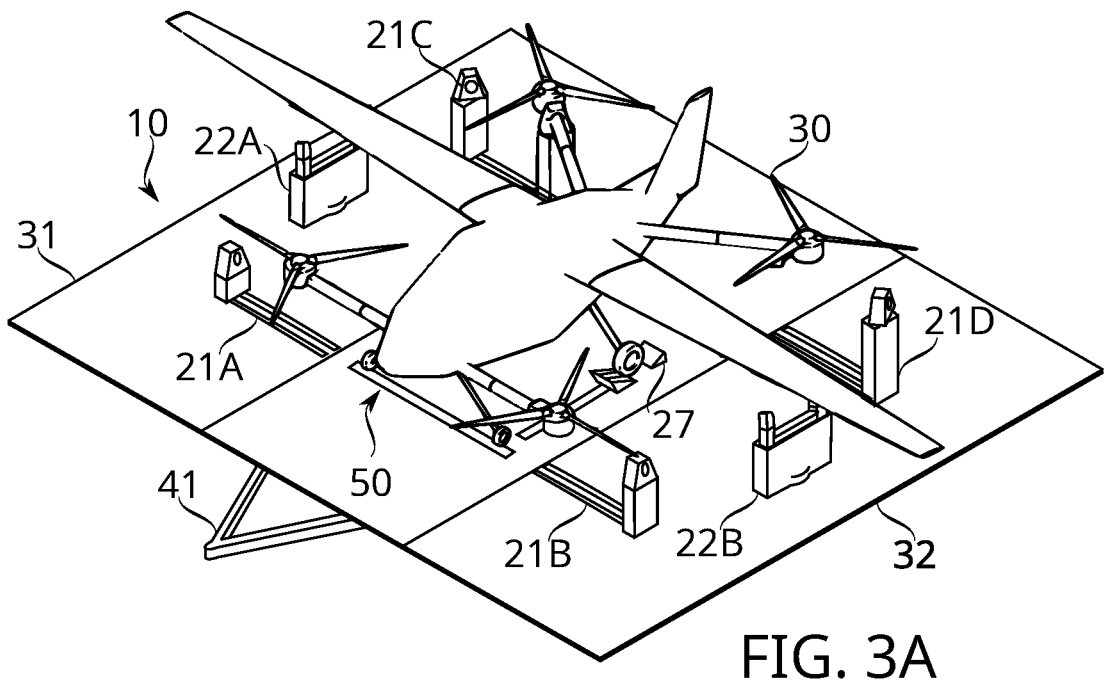
FIG. 3A illustrates an aircraft in its parking position, according to some embodiments of the present disclosure.

Brief reference is now made to FIG. 3A, which illustrates an aircraft 50 in its parking position, according to some embodiments of the present disclosure. Aircraft 50 optionally was landed directly onto panel 30, with forward/reverse taxiing afterward as necessary to adjust its position.

Figure 3B:
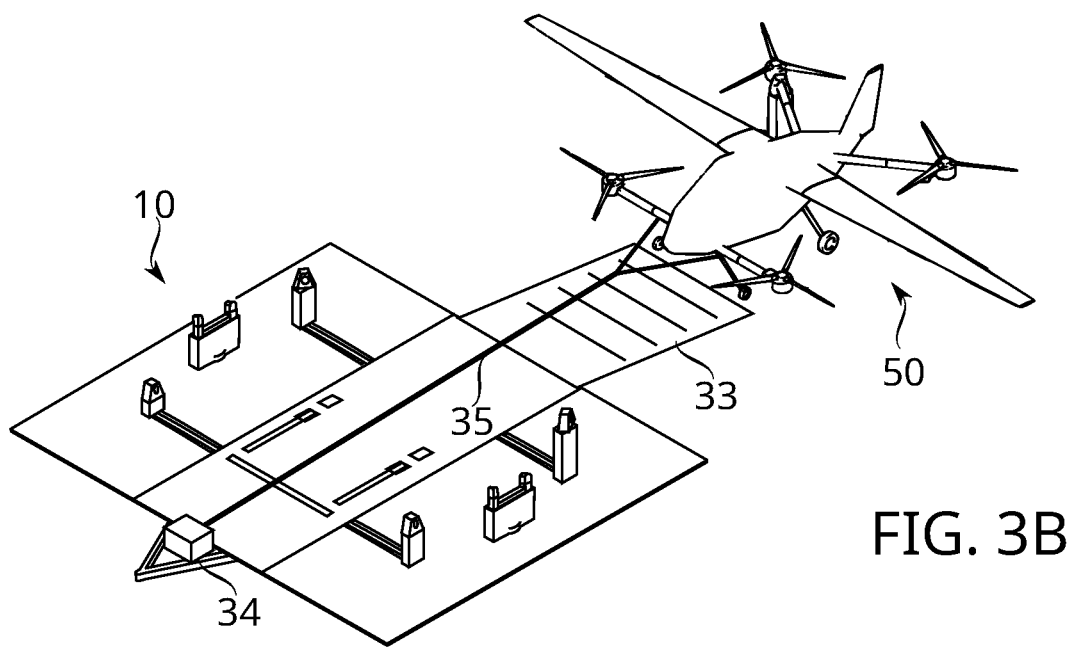
FIG. 3B illustrates an aircraft being winched into its parking position, according to some embodiments of the present disclosure.

Brief reference is now made to FIG. 3B, which illustrates an aircraft 50 being winched into its parking position, according to some embodiments of the present disclosure. Winch 34, tow-line 35, and/or ramp 33 may be provided for normal use, and/or for use in exceptional circumstances, e.g., in cases where aircraft 50 had to be landed while stowing system 10 was unavailable/unprepared for use. In some embodiments, a plurality of winches and/or tow-lines are used, providing the potential advantage of further stabilizing aircraft 50 as it is positioned, and/or once it is positioned. In some embodiments, aircraft 50 comprises connection elements such as hooks or brackets (not shown, but present, e.g., on struts of rotor assemblies 51A-51B) which allow it to be easily attached to tow-line(s) 35.

In case a qualified operator of aircraft 50 is unavailable at the time of eventual loading/stowage of aircraft 50, it is a potential advantage to support moving it onto the platform without having the operate systems of the aircraft 50 itself. Optionally, aircraft 50 taxis via ramp 33 onto the platform defined by stowing system 10 under its own power.

In some embodiments, the aircraft undergoes certain conformational changes which are at least partially independent of the external stowing system. For example, the wings of the aircraft may fold to stowed positions after landing, after/during parking, and/or after/during the attachment operations of block 114 (e.g., as described herein in relation to FIG. 6B).

Returning to FIG. 1A: At block 114, in some embodiments, aircraft sub-assemblies are attached to their respective support elements. For example, in some embodiments, once the aircraft is placed at its parking position, different arms and levers on the trailer can be unfolded from the trailer floor and flattened walls. In some embodiments, these arms and levers are folded into the trailer walls and floor so that they are not obstacles during landing and takeoff from the trailer.

Figure 2B:
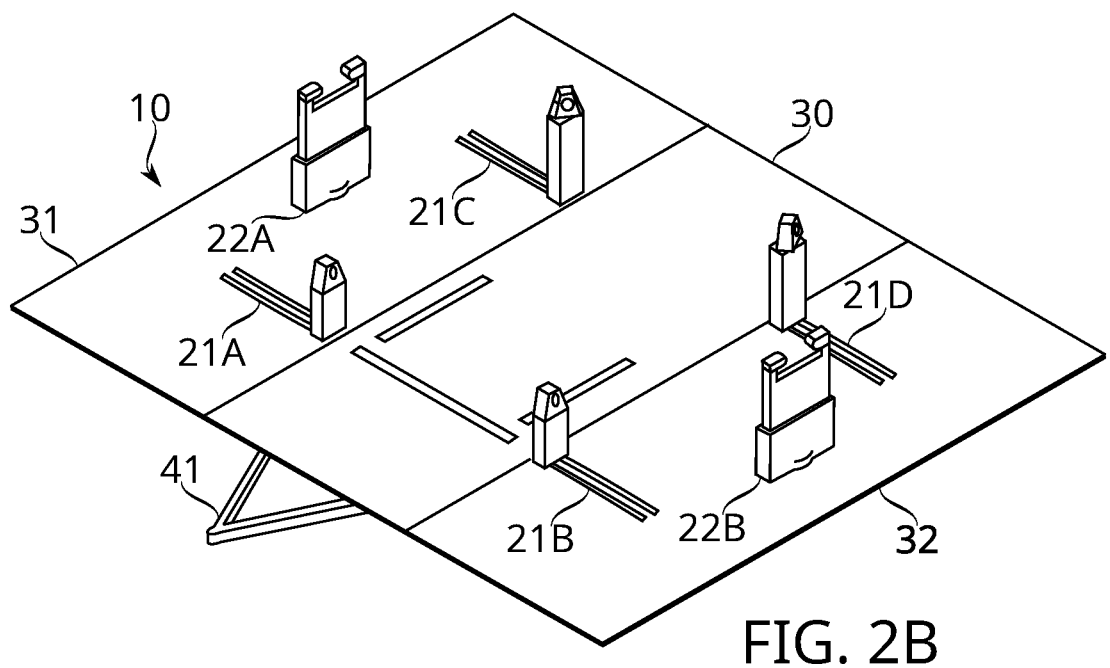
FIG. 2B shows the stowing system of FIG. 2A with the support elements and positioned as when attached to an aircraft, according to some embodiments of the present disclosure.

Brief reference is made to FIG. 2B, which shows the stowing system 10 of FIG. 2A with the support elements 21A-21D and 22A-22B positioned as when attached to an aircraft, according to some embodiments of the present disclosure. Brief reference is also now made to FIG. 3C, which shows aircraft 50 attached to stowing system 10, according to some embodiments of the present disclosure. In particular, aircraft 50 is shown with its various sub-assemblies comprising rotor assemblies 51A-51D and wings 52A-52B attached to their respective support elements 21A-21D and 22A-22B. It should be understood that there is no particular limitation of embodiments of the present disclosure to require the number of rotor assemblies and associated support elements shown (four pairs); there may be more or fewer of them. Nor need there be necessarily a support element for each rotor assembly. For example, some number of the rotor assemblies, in some embodiments, are non-collapsing, or folding without the provision of attachable support. Similarly, it should be understood that there is no particular limitation of embodiments of the present disclosure to require the number of wings and associated support elements shown (two pairs); there may be more or fewer of them (e.g., no wings, or four wing sub-assemblies). Nor is there necessarily a support element for each wing that is present. For example, some number of the wings, in some embodiments, are non-collapsing, or folding without the provision of attachable support.

Figure 3C:
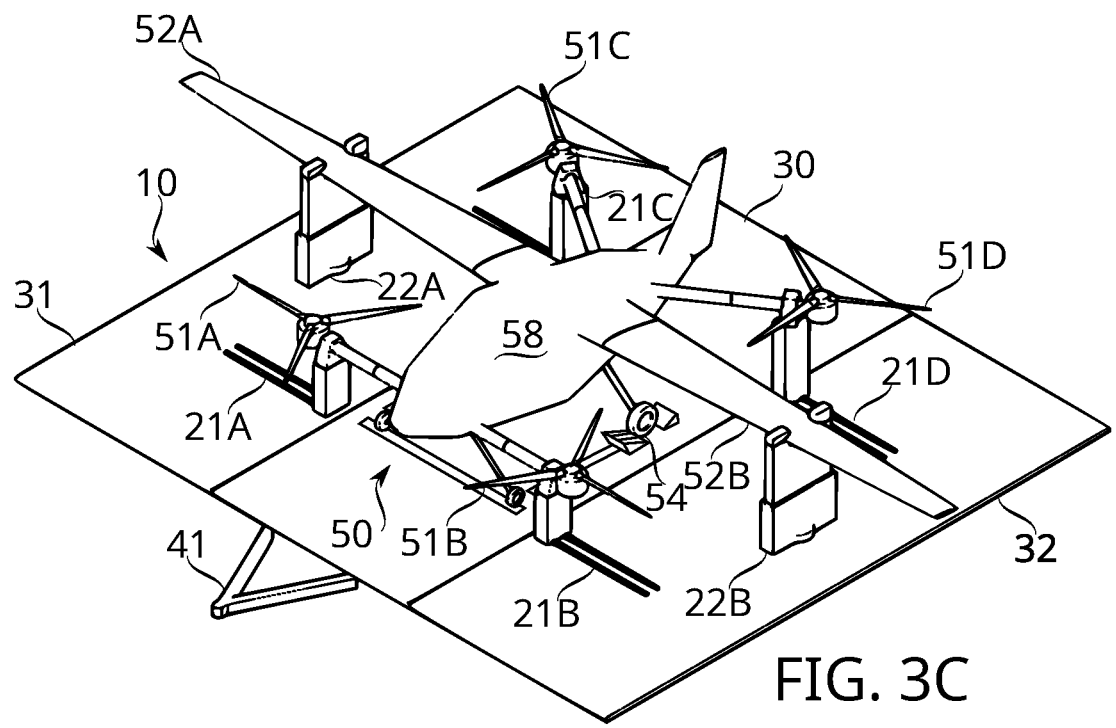
FIG. 3C shows aircraft attached to stowing system, according to some embodiments of the present disclosure.

Also shown is fuselage 58, and the wheels 54 of the aircraft landing gear. Otherwise, the components shown are as described in relation to FIG. 2A. It should be noted that the support elements 21A-21D and 22A-22B are in different positions in FIGS. 3C and 2B compared to FIG. 2A. The positioning shown in FIG. 2A may be the positioning used for keeping the support elements out of the way during aircraft positioning, e.g., landing, and may also be a suitable configuration to remove them to for avoiding interfering with takeoff.

Arm and lever unfolding can be performed manually and/or by electric and/or hydraulic actuators. An unfolding mechanism can be, for example, a hinge and/or bearing on the trailer floor or wall that the arm or lever rotates around from a position flat along the wall or floor to a position where its moving end can reach an aircraft motor arm or wing. Additionally or alternatively, an arm or lever can have a telescopic length adjustment mechanism to allow it to be extracted for a position close to the floor or wall of the trailer towards an aircraft arm or wing.

Figure 4:
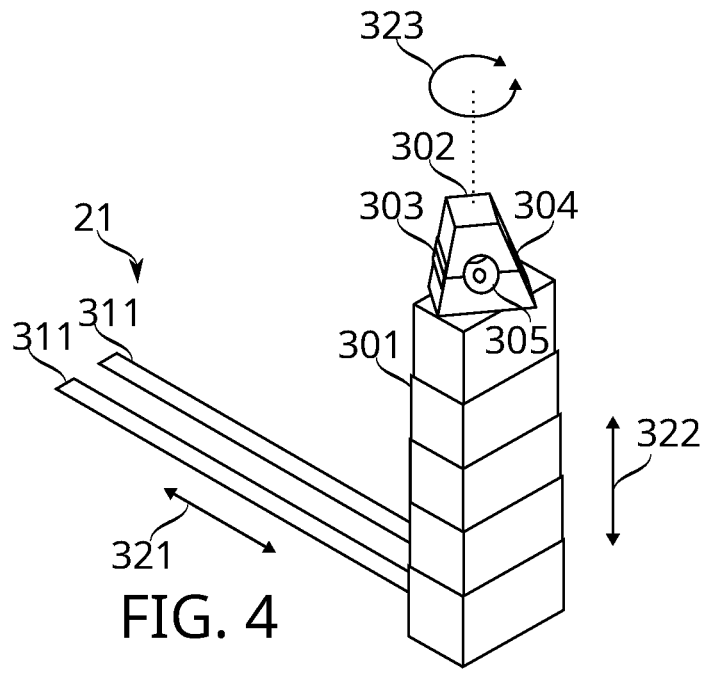
FIG. 4 schematically represents a support element for a rotor assembly, according to some embodiments of the present disclosure.

Brief reference is now made to FIG. 4, which schematically represents a support element 21 for a rotor assembly, according to some embodiments of the present disclosure. Support element 21 is, for example, a support element such as any of support elements 21A-21D. This example of a support element comprises tracks 311 along which telescoping body 301 slides (in the directions shown by axis 321). Telescoping body 301 telescopes/collapses along axis 322. Atop telescoping body 301 is located clamp 302. Clamp 302 (e.g., a split ring) opens on hinge 303, opening at 304 to accept a strut of a rotor assembly within aperture 305. Clamp 302 is optionally rotatably around an axis in rotational directions shown by arrows 323. Together, these mechanisms provide three degrees of freedom through which clamp 302 can be moved in order to (1) get it out of the way for landing, (2) engage with a rotor assembly in order to support it while attached to the parked aircraft, and (3) move it, along with an attached rotor assembly, to a position which allows the stowing system to be compacted for transport. It should be understood that other structures may be used additionally or alternatively in order to provide moveable sub-assembly support, and that the degrees of freedom provided (axes of rotation and/or translation) may be fewer or greater in number, and may be of the same or different than in the example illustrated. In the example shown, the rotor assembly is completely detachable (at least in terms of structural support) from the aircraft; however, in some embodiments, one or more rotor assemblies may be instead loosened, e.g., to allow folding on a hinge or swivel while retaining some structural attachment to the aircraft.

Figure 5:
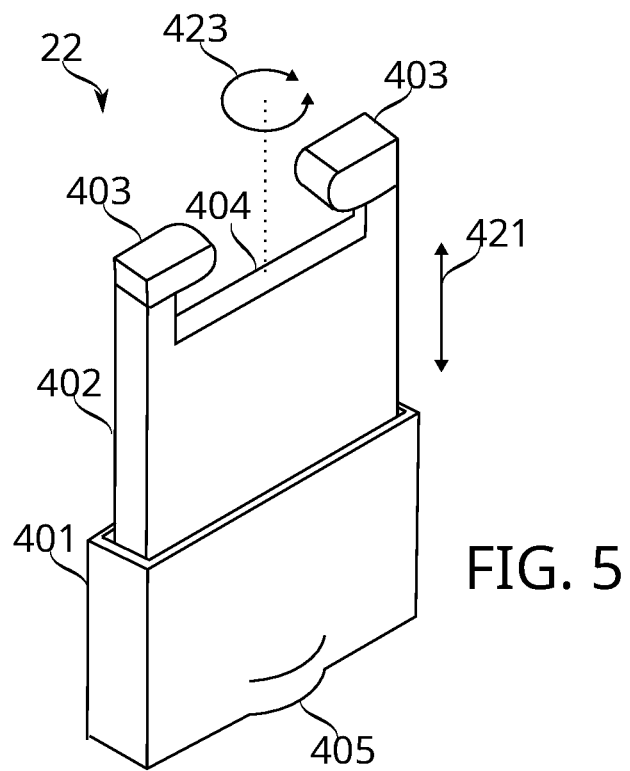
FIG. 5 schematically represents a support element for a wing, according to some embodiments of the present disclosure.

Brief reference is also made to FIG. 5, which schematically represents a support element 22 for a wing, according to some embodiments of the present disclosure. Support element 22 is, for example, a support element such as any of support elements 22A-22B. This example of a support element comprises a main body 401, from which telescoping body 402 extends and retracts, moving along axis 421. Main body 401 is rotatably connected to an underlying platform (e.g., a beam and/or panel) at attachment region 405, allowing it to rotate around a vertical axis as indicated by double-headed arrow 523. Telescoping body 402 also comprises, in some embodiments, a clamp sized to fit around and hold a wing sub-assembly 52A and/or 52B. Telescoping body 402 may comprise, for example, receiving area 404 (a docking port), and padded grips 403. Grips 403 optionally swivel out of the way in order to admit a wing sub-assembly 52A, 52B into receiving area 404, then swivel back again to clamp it into place. It should be understood that other structures may be used additionally or alternatively in order to provide moveable sub-assembly support, and that the degrees of freedom provided (axes of rotation and/or translation) may be fewer or greater in number, and may be of the same or different than in the example illustrated. In the example shown, wings are completely detachable (at least in terms of structural support) from the aircraft; however, in some embodiments, one or more wings may be instead loosened, e.g., to allow folding on a hinge or swivel while retaining some structural attachment to the aircraft.

Other mechanisms for attachment used in some embodiments of the present disclosure include, for example, screws, bolts, straps, buckles, and/or other attachment mechanisms. Attachment is optionally performed manually and/or using electric actuators.

Returning once again to FIG. 1A: at block 116, in some embodiments, aircraft sub-assemblies are detached and/or loosened from the main body. For example, pins, bolts and/or other securing mechanism that secure rotor assemblies 51A-51D (motor arms) and/or wings 52A-52B to the aircraft fuselage are released. In some embodiments, release is performed manually. Optionally, release from the body is at least partially automated. For example, power torque wrenches may be associated with their respective support elements, located so that upon attachment they are positioned to operate the securing mechanism. Similarly, pins and/or bolts may be extracted automatically, e.g., through the use of electromagnets, grippers, gravity, and/or relative movements of a sub-assembly and main aircraft (e.g., twisting of a strut in its mounting) which assist release. In some embodiments, one or more sub-assemblies of the aircraft remain mechanically attached, e.g., to a swivel or hinge, but are loosened to allow them to be stowed in conjunction with operation of the support element(s) to which they are attached.

At block 118, in some embodiments, the support elements with sub-assemblies attached are moved to their stowed locations. For example, the support elements (e.g., trailer arm or lever) move along sliders, or rotate on pivots that attach its base to the trailer floor or walls. Sliding, rotating and any other movements may be performed manually or automatically, e.g., using electric actuators. In some embodiments, moving the various sub-assemblies (e.g., wings and motor arms/rotor assemblies) completely separates them from the fuselage. In some embodiments, there remains partial attachment via non-rigid elements such as wiring and/or tubing. In some embodiments, these elements are also detached, either separately (e.g., release of plug connectors), or as part of the mechanical separation operations of block 116. For example, electrical contacts may be made/broken when a rotor assembly is secured into place/detached, as a result of fixed-position electrode elements being brought into electrical contact with one another.

The movements finally position the support elements with the aircraft-detached sub-assemblies the support in locations on the stowing system (e.g., trailer floor or wall) that allow further folding of the stowing system (e.g., closing of its walls) without object collision.

Figure 6A:
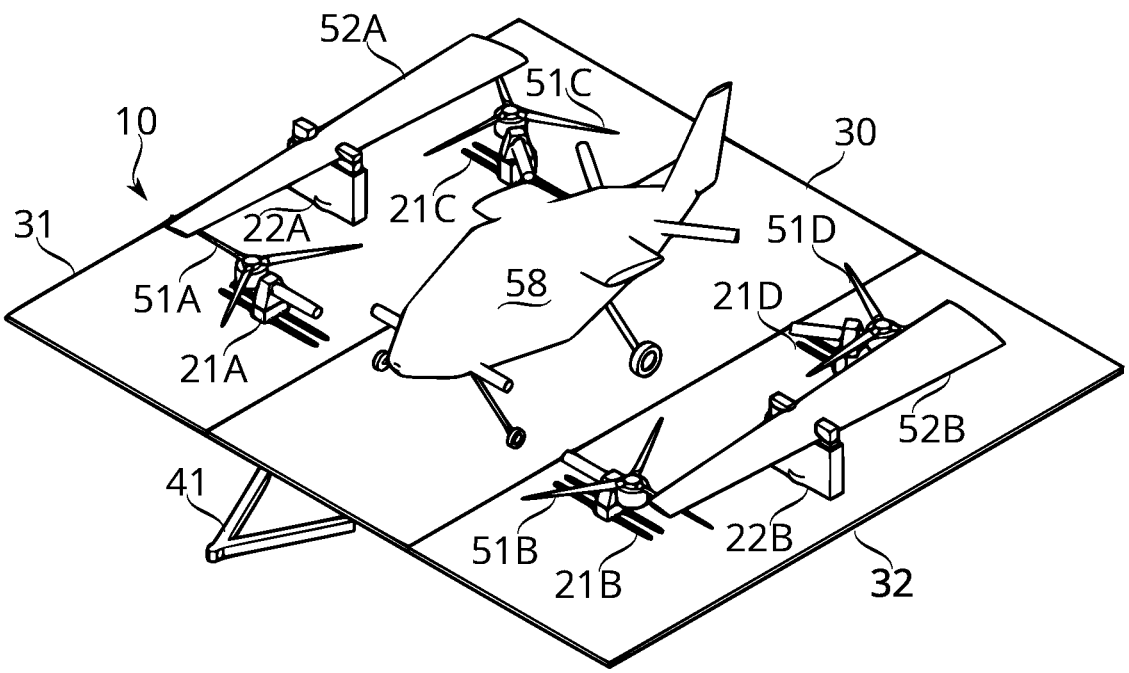
FIGS. 6A-6B schematically illustrate support elements repositioned after attachment to their respective aircraft sub-assemblies, and release of those sub-assemblies from attachment to the main aircraft body, according to some embodiments of the present disclosure.
Figure 6B:
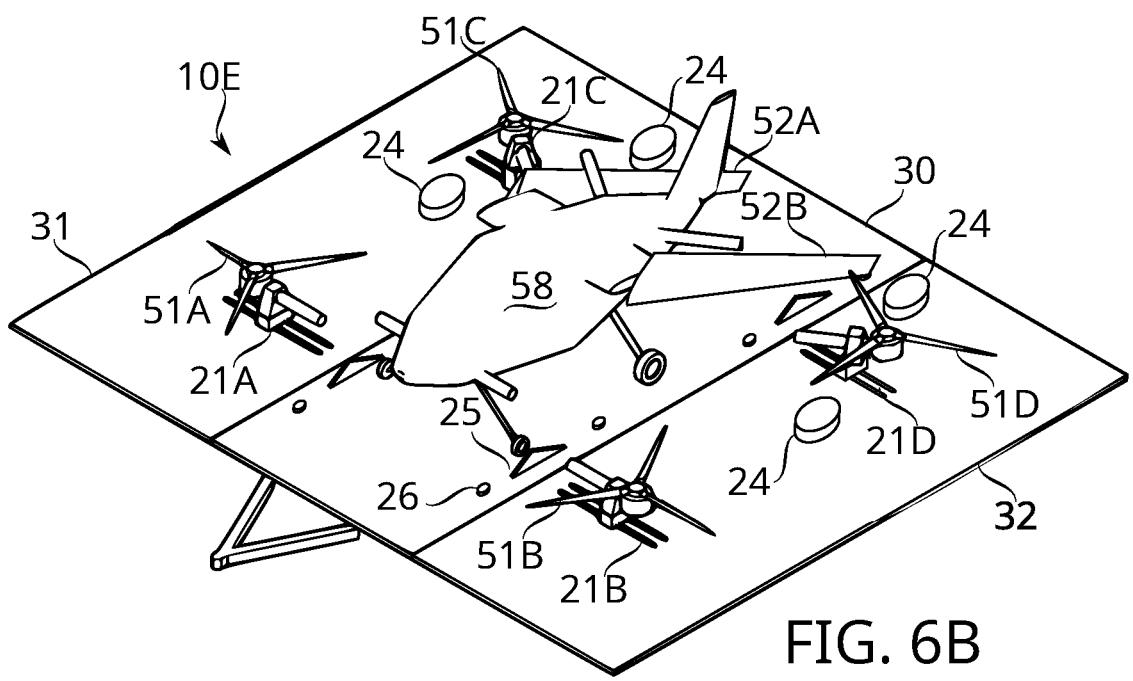

Reference is now made to FIGS. 6A-6B, which schematically illustrate support elements repositioned after attachment to their respective aircraft sub-assemblies, and release of those sub-assemblies from attachment to the main aircraft body, according to some embodiments of the present disclosure.

The example of FIG. 6A shows positioning following from the situation of, e.g., FIG. 3C. Support elements 21A-21D (as also shown in stowing system 6E of FIG. 6B) have been moved along their tracks, and lowered (detelescoped). This movement creates sufficient clearance for the blades and/or arm of the respective rotor assemblies 22A-22D so that when panels 31, 32 are folded into walls, there is no collision with either panel 30 or aircraft main fuselage 58. Optionally, clearance is obtained/increased, e.g., by rotating clamp 302 relative to body 301. In some embodiments, the blades of one or more of rotors 51A-51D are long enough that they could (or do) contact with panel 30 upon folding, but their rotational capability prevents damage.

Additionally, panel 30 may include guides 25 which help to ensure that the blades of rotors are guided to safe locations, for example as shown in FIG. 6B. Additionally or alternatively, panel 30 includes bolsters and/or attachment points 26 which prevent further movement of the rotors, e.g., during transportation.

The example of FIG. 6A also shows the repositioning of support elements 22A-22B, which are likewise lowered, but in this case rotated (e.g., as indicated by arrows 423 in FIG. 5) rather than moved on sliders. Optionally, sliders are also provided and used. It may be understood that movements of the various support elements may be performed in an order that prevents collisions; e.g., support elements 21A-21D may be lowered before performing the rotational movements of support elements 22A-22B.

FIG. 6B provides an example of a different way of managing wing collapse. In this example, wings 52A-52B remain mechanically attached to the fuselage 58, being partially releasable from their fixed flight-ready positions to swivel backward and inward as part of stowing operations. Wing folding may be automatically actuated or manual. Manual wing folding may be mechanically assisted by, e.g., an internally mounted friction gearing system which takes up part of the wing weight.

Even in the case of a folding (rather than fully detachable) wing, a stowing system 10E optionally provides special features such as bolsters 24, which help to keep the wings 52A-52B in place during transportation, and/or protect them from vibrations and/or jarring which might allow them to rub against and/or collide with panels 31, 32 once elevated as walls. Bolsters 24 may accommodate straps, buckles, eyelets or other elements which can be used to secure the wings 52A-52B in place, and may be padded to allow them to press up against wing surfaces without damaging them. In some embodiments, stowing system 10E is still provided with support elements (not shown) which attach to the wing and move it (and/or move with it) as part of stowing, but in these cases, wings retain some mechanical attachment to the main aircraft, and the movements of the attached support elements accommodate this attachment, e.g., by moving in an arc that follows the swing of the wing, and/or by sliding along the wing surface. The wings of FIG. 6B should be understood as an example of folding sub-assemblies more generally; for example, in some embodiments, one or more rotor assemblies swivel/fold relative to their location of attachment to the aircraft as part of stowing.

Returning to FIG. 1A: at block 120, in some embodiments, stowing of the aircraft is completed. In some embodiments, this comprises folding up panels 31, 32 to form walls. The walls may act to protect the aircraft from the environment. Folding up the walls also reduces the trailer width to be suitable for towing on public roads. Other panels (e.g., front/back/roof) are optionally added and/or folded into place in order to create a fully enclosed trailer.

Brief reference is now made to FIG. 7, which shows a folded-wall form of the embodiment illustrated in FIGS. 3A and 6A. In addition to elements already described, trailer wheels 42 are seen in the folded view.

Figure 8A:
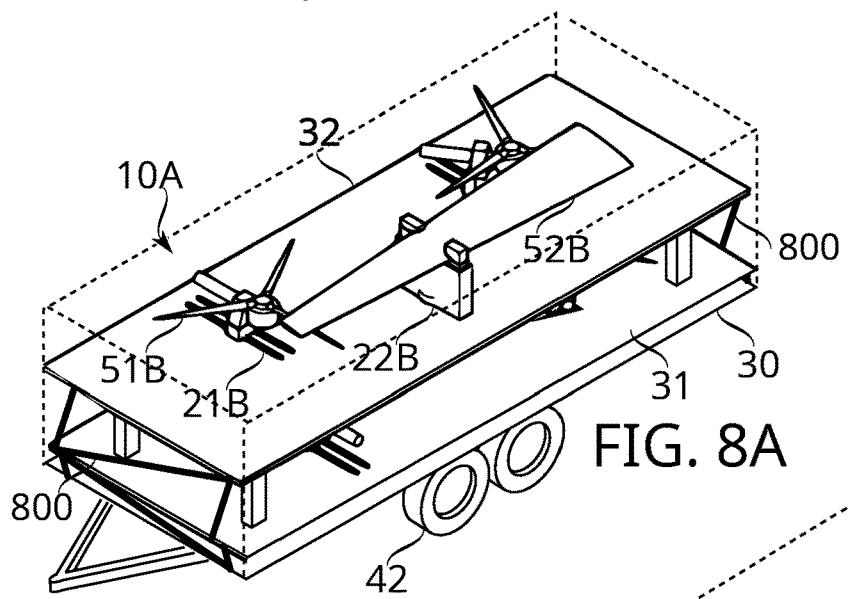
FIGS. 8A-8B schematically represent a two-trailer version of a stowing system, according to some embodiments of the present disclosure.
Figure 8B:
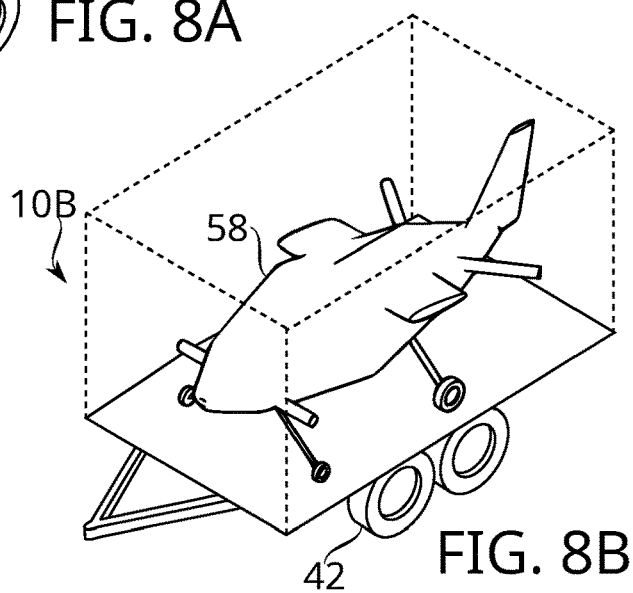

Reference is made to FIGS. 8A-8B, which schematically represent a two-trailer version of a stowing system, according to some embodiments of the present disclosure. It may be understood that once the main aircraft fuselage is detached from its sub-assemblies, there is no particular obstacle to moving it once again as part of stowing. For example, it may be moved further forward on the platform (length permitting), or even rolled on to a second trailer. In the example shown (FIG. 8A), panels 31-32 have been slid on rail assemblies 800 toward the center of the original trailer 10A, elevating sufficiently to avoid collision with each other and/or panel 30. Before this, however, the main aircraft fuselage 8B has been transferred to a second trailer 10B. This can have a potential advantage by redistributing a towing load to a plurality of vehicles. Also, the trailer sizes can optionally be adjusted more freely in one or more dimensions; e.g., a slightly wider aircraft body may potentially be accommodated for the same width trailer (since the wings and rotors do not need to fit alongside it). Potentially, aerodynamics of the trailers may be improved by removing constraints for all elements to be packaged together. Particularly in fleet operations, it may be convenient to use a standard trailer (e.g., an automobile transport trailer) for transportation together of a plurality of main aircraft main fuselages, with the separated sub-assemblies being transported, e.g., after combination by stacking into a single load.

Figure 8C:
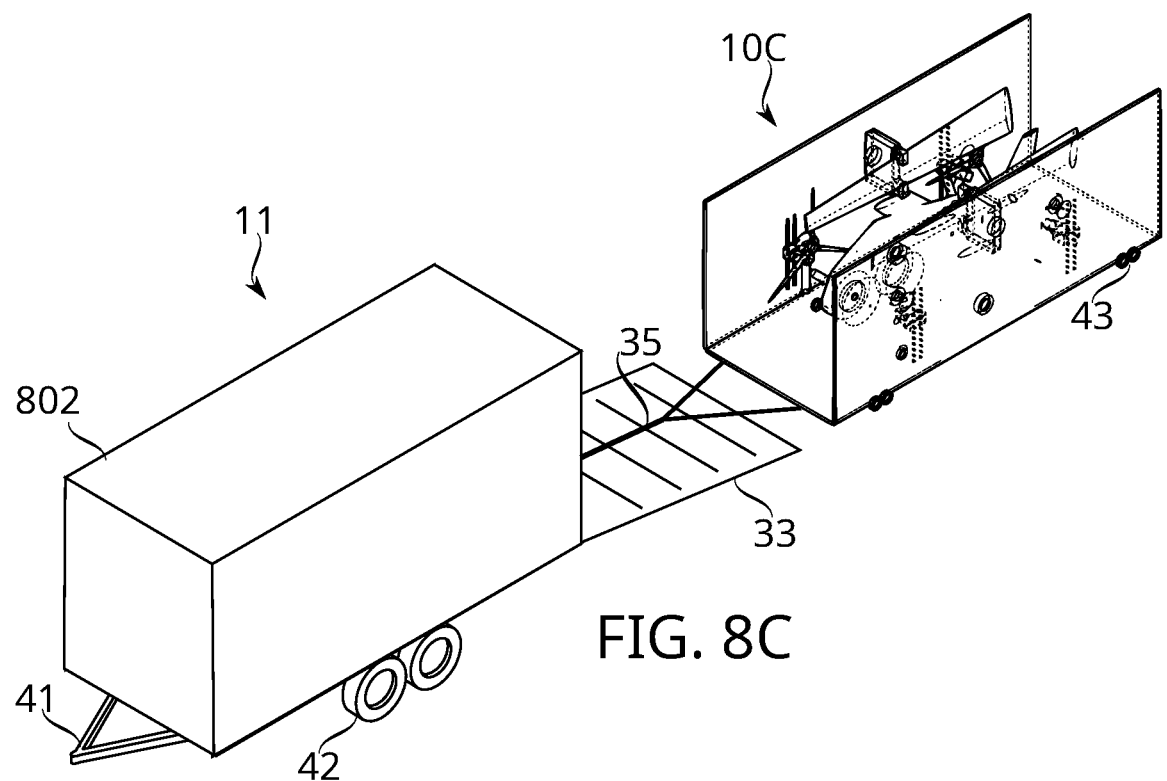
FIG. 8C schematically illustrates a trailer-insertable configuration of a stowing system, according to some embodiments of the present disclosure.

Reference is now made to FIG. 8C, which schematically illustrates a trailer-insertable configuration of a stowing system 10C, according to some embodiments of the present disclosure. In some embodiments, a trailer 11 is provided separately from the apparatus of stowing system 10C. Stowing system 10C is operated generally as described for other embodiments such as the embodiments of FIGS. 3A, 6A and 7, but instead of being itself a trailer, it is loaded for transport up into trailer 11, e.g., being winched on by cable 35 up ramp 33 while travelling on caster wheels 43.

This potentially results in some added size constraints during transportation (e.g., insofar as the height of caster wheels 43 is added to the height of trailer w heels 43 and/or the walls of trailer box 802 are added to the width defined by stowing system 10C). However, in other situations, such as storage, it provides potential advantages for size. For example stowing system 10C may fit through a standard sized garage door (e.g., by being less than about 2.13 m tall, or less than about 2.44 m tall), even though it does not if the height of wheels 42 is added to it. Decoupling trailer functionality from stowing functionality also has potential advantages for maintenance and/or upgrades. Furthermore, the decoupling potentially allows the stowing system to be configured with less concern for protecting the aircraft from the elements; e.g., as in the open frame version of stowing system 10D of FIG. 9.

Method of Unstowing

Figure 1B:
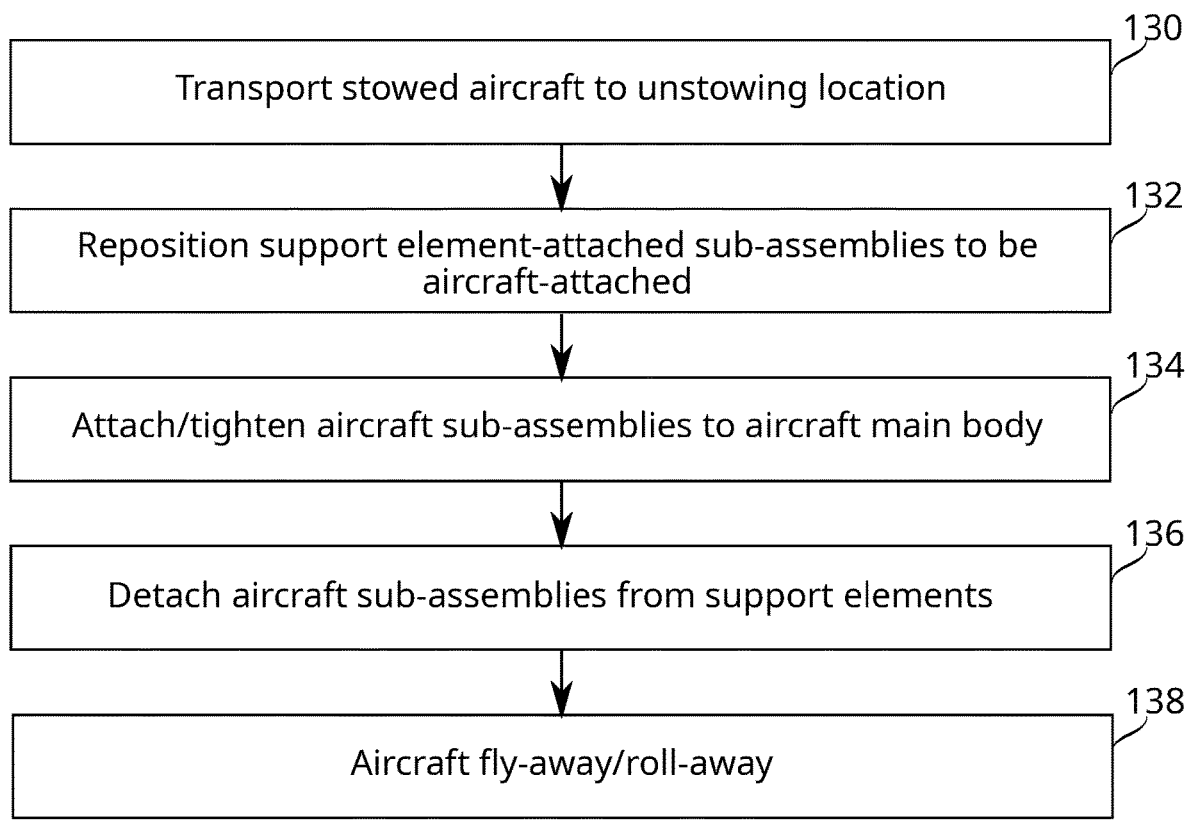
FIG. 1B is a schematic flowchart of a method of restoring a stowed aircraft to a flight-ready configuration, according to some embodiments of the present disclosure.

Reference is now made to FIG. 1B, which is a schematic flowchart of a method of restoring a stowed aircraft to a flight-ready configuration, according to some embodiments of the present disclosure. This unpacking is generally the reverse of packing.

For example: at block 130, in some embodiments, the stowed aircraft is transported (e.g., towed) to its stowing location. At block 132, in some embodiments, the sub-assemblies are returned to a position that allows their attachment to the aircraft, while the element supports remain attached. At block 134, in some embodiments, the sub-assemblies are attached and/or tightened to the aircraft main fuselage, and at block 136, the sub-assemblies are detached from their respective support elements, and the support elements remove (automatically or manually) to their "safe" positions, e.g., as described in relation to FIG. 2A. At block 138, the aircraft flies or rolls away from the stowing system.

Optionally, a stowing system is provided with autonomous capabilities, allowing it to, e.g., fold itself back up after the aircraft is departed, or even (e.g., in embodiments wherein wheels 54 are powered by batteries such as batteries of charger station 44) move to a protected and/or out-of-the-way position away from the landing/launching pad area proper. This has potential advantages for reducing exposure of the stowing system to the elements, and/or saving space in space-constrained areas.

Aircraft and Stowing System Features

It is noted that in some embodiments of aircraft 50, wings 52A-52B are assistive to flight characteristics such as efficiency and/or maneuverability, but not actually required for flight. In unusual situations, wings 52A-52B may remain stowed while the rest of the aircraft is made flight-ready.

In some embodiments of the present disclosure, a stowing system is provided with sensors and/or cameras which are configured to sense the configuration of the stowing system and/or aircraft 50 during stowing and/or un-stowing. Sensor data may be relayed (e.g., via a computer processor and through a computer network connection) to a supervisor (e.g., an off-site technician or aircraft owner) who can use the sensor data to verify that operations of stowing and/or un-stowing are being performed fully and/or in the correct order. In some embodiments, the computer processor provides automatic feedback to an on-site worker; e.g., in the form of one or more indicators (lights, sounds, and/or screen displays, for example) which confirm proper operation and/or indicate errors/omissions.

Additionally or alternatively, cameras and/or sensors may be used to monitor the stowed aircraft during transportation. Cameras show the aircraft itself, for example. Sensors optionally monitor positioning of the aircraft. Optionally, sensors monitor transportation conditions such as vibrations and/or shocks. Conditions outside certain limits may trigger warnings during transportation, and/or trigger instructions to perform special inspections on the aircraft to help ensure continued airworthiness. Sensor data, optionally including images, may be stored and/or sent to a maintenance service to assist in detection of aircraft changes which may indicate issues such as corrosion. In some embodiments, the motions performed during stowing also serve to move sub-assembly surfaces along paths which include one or more close-inspection cameras. Knowing the path and relative positioning, images taken by the close inspection cameras can optionally be referenced to particular areas of inspected surfaces. In some embodiments, the cameras and/or sensors are included as part of devices (e.g., rods and/or cables) which can be inserted to the interior of one or more sub-assemblies (e.g., to within a wing) as a normal part of stowing the aircraft. Apart from showing the interior condition of the sub-assembly itself, the cameras and/or sensors optionally monitor environmental conditions over time, e.g., the occurrence of condensation and/or unusual temperature conditions.

In some embodiments of the present disclosure, a stowing system comprises mirrors, placed to assist sensing and/or manual inspection. For example, a mirror may be positioned under a rotor assembly to assist in verification that rotor blade surfaces remain undamaged.

In some embodiments, stowing systems and aircraft are not necessarily in a 1:1 relationship, with the result that an aircraft may be stowed with different stowing systems at different times. This may occur, for example, when operating a fleet of aircraft and/or providing a network of landing, storage, and/or maintenance facilities. Optionally, a stowing system identifies which particular aircraft it is being used with, and may adjust its operation, sensing, and/or reporting accordingly. Identification may comprise, for example visual (e.g., bar-code) identification, and/or electronic (e.g., RFID-based) identification. Examples of customization of operation per aircraft include sending sensed data and/or operational logging to different aircraft data accounts. In some embodiments, a stowing system is operable with a plurality of aircraft types (e.g., variants of a basic model, or even different models). The stowing system may provide fittings which can work with any of these types, or optionally which need to be selected and/or adjusted according to type. The stowing system may adjust how it positions (and/or recommends positioning) support elements so that the sub-assemblies they support are correctly positioned during stowing.

In some embodiments, a suspension sub-system of a trailer stowing system is adjustable according to its particular aircraft load, and/or according to transportation conditions. For example, the suspension may adjust for aircraft types of different weight. In some embodiments, the suspension is adjustable to avoid vibrating the aircraft at certain frequencies which might coincide with the mechanical resonant frequencies of sub-assemblies such as wings. In some embodiments, sensors operating during transportation are configured to detect and report oscillations of the load and/or portions thereof. Optionally, oscillations are compensated for by adjusting the stiffness of the suspension. In some embodiments, oscillations are mitigated by proposing to the driver that towing speed be reduced or increased, and/or care otherwise taken, in order to avoid potentially damaging driving conditions.

In some embodiments of the present disclosure, and aircraft 50 comprises in-design elements which serve to adapt it to use with a stowing system. For example, the aircraft may include locations specially adapted for attachment to support elements of the stowing system; e.g., eyelets, brackets, screw holes and/or hooks. In some embodiments, one or more sub-assemblies is specially strengthened at a location according to how it interacts with the support elements. For example, a wing may be strengthened with larger and/or extra struts (or a stiffening plate) around a location where it is attached to the stowing system, even though this does not necessarily contribute to in-flight performance.

In some embodiments, an aircraft 50 has sufficient lifting capability to actually transport an associated (e.g., still-attached) stowing system in whole or in large part to a location which is otherwise relatively difficult or inconvenient to reach. For example, an aircraft 50 may transport a stowing system (to the top of a roof, to the deck of a water-borne vessel, or to a location in the midst of rough terrain. This transporting may exclude elements providing trailer functionality in order to save weight, and the transporting may occur in a special "drone" mode piloted from outside the aircraft to further save weight.

It is noted that the aircraft and/or the stowing system may serve as sources of electrical power. This provides, for example, the capability to establish ad hoc charging networks in areas with sparse infrastructure, with added capabilities to protect themselves and/or charging/discharging aircraft from temporary adverse environmental conditions as necessary.

General

As used herein with reference to quantity or value, the term "about" means "within ±10% of".

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the present disclosure may include a plurality of "optional" features except insofar as such features conflict.

Throughout this application, embodiments may be presented with reference to a range format. It should be understood that the description in range format is merely for convenience and brevity and should not be construed as an inflexible limitation on the scope of descriptions of the present disclosure. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although descriptions of the present disclosure are provided in conjunction with specific embodiments, it is evident that many alternatives, modifications and variations will be apparent to those skilled in the art. Accordingly, it is intended to embrace all such alternatives, modifications and variations that fall within the spirit and broad scope of the appended claims.

It is appreciated that certain features which are, for clarity, described in the present disclosure in the context of separate embodiments, may also be provided in combination in a single embodiment. Conversely, various features, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, to the same extent as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. An aircraft stowing system, comprising:
    a platform sized and shaped to receive a landing gear of an intact aircraft while supporting the aircraft's weight; and
    a plurality of support elements, moveable relative to the platform while also attached thereto, and moveable between at least:
        a first configuration, in which the support elements are approximated to respective sub-assemblies of the intact aircraft, and each positionable to support a portion of the weight of its respective sub-assembly upon detachment and/or loosening of the sub-assembly from the aircraft;
        a second configuration, in which the support elements with their respective supported sub-assemblies detached and/or loosened from the aircraft are moved into positions such that the aircraft is compacted in at least one dimension relative to the intact aircraft.

2. The aircraft stowing system of claim 1, wherein each of the supported sub-assemblies is attached to its respective supporting support element.

3. The aircraft stowing system of claim 1, wherein at least one of the support elements supports the entire weight of its respective supported sub-assembly.

4. The aircraft stowing system of claim 1, wherein the platform is a platform of a trailer, configured with wheels and towing hitch.

5. The aircraft stowing system of claim 1, wherein a transition between the first and second configurations comprises, for each of a plurality of the support elements at least:

a first motion that slides and/or rotates the support element at a location of attachment connecting the support element to a first portion of the platform; and a second motion that moves the first portion of the platform together with the attached support element and relative to a second portion of the platform.

6. The aircraft stowing system of claim 1, wherein the platform is foldable along one or more hinges, and a motion to transition between the first and second configurations comprises folding the platform to bring the support elements and their respective supported sub-assemblies into new relative positions.

7. The aircraft stowing system of claim 6, wherein folding the platform converts portions of the platform into walls on either side of a portion of the platform that remains as a floor.

8. The aircraft stowing system of claim 7, wherein the floor supports a main fuselage of the aircraft, while the walls support at least some of the support elements and their respective supported sub-assemblies.

9. The aircraft stowing system of claim 1, wherein at least one support element is configured to move along a track with its supported sub-assembly to transition between the first and second configurations.

10. The aircraft stowing system of claim 1, wherein at least one support element is configured to rotate, along with its supported sub-assembly, around an axis substantially perpendicular to the platform at said support element's location of attachment thereto, to transition between the first and second configurations.

11. A method of stowing an aircraft, comprising:
positioning an aircraft on a platform comprising a plurality of support elements attached to the platform;
attaching the support elements to respective sub-assemblies of the aircraft while the support elements remain attached to the platform; and
moving the support elements to new positions compacting the aircraft and the platform in at least one dimension while remaining attached to both the platform and their respective sub-assemblies.

12. The method of claim 11, wherein the positioning comprises landing the aircraft on the platform from the air.

13. The method of claim 11, wherein the moving comprises folding the platform.

14. The method of claim 13, wherein folding moves portions of the platform to form surfaces at least partially enclosing the aircraft and the sub-assemblies.

15. The method of claim 11, comprising detaching the respective sub-assemblies from a main fuselage of the aircraft.

16. The method of claim 11, wherein the moving comprises moving at least one of the support elements to a new location of attachment with the platform while remaining attached to the platform.

17. The method of claim 11, wherein the moving comprises rotating at least one of the support elements around a location of attachment with the platform while remaining attached to the platform.

18. The method of claim 11, wherein the platform is part of a trailer, and comprising towing the trailer while the support elements with their respective attached sub-assemblies are in the new positions.

19. The method of claim 11, comprising loading the platform onto a trailer while the support elements with their respective attached sub-assemblies are in the new positions.

20. The method of claim 19, comprising towing the trailer with the platform, after the platform is loaded onto the trailer.

* * * * *